F. BOOKER.
GRINDING-MACHINE.
No. 188,230. Patented March 13, 1877.
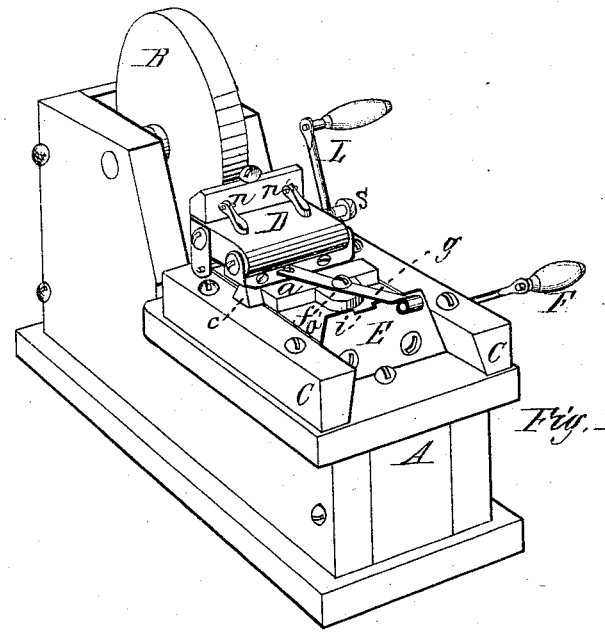
Fig. I.
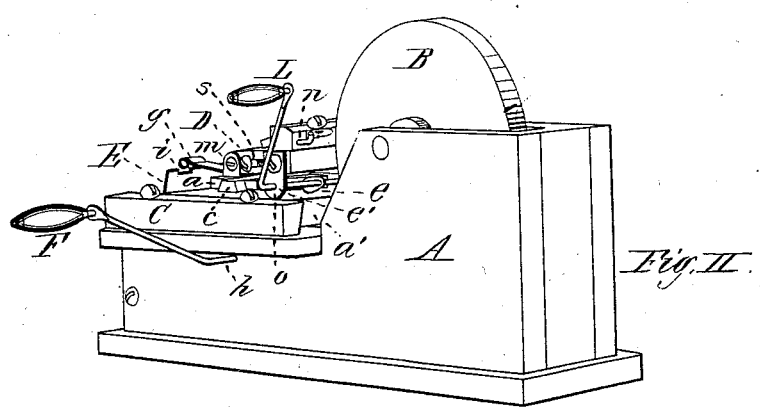
Fig. II.
Witnesses—
Inventor,
Farewell Booker
By T. A. Curtis, his Atty.
N. PETERS, PHOTO-LITHOGRAPHER, WASHINGTON, D C.

UNITED STATES PATENT OFFICE.

FAREWELL BOOKER, OF SHELBURNE FALLS, MASSACHUSETTS.

IMPROVEMENT IN GRINDING-MACHINES.

Specification forming part of Letters Patent No. 188,230, dated March 13, 1877; application filed November 27, 1876.

*To all whom it may concern:*

Be it known that I, FAREWELL BOOKER, of Shelburne Falls, in the State of Massachusetts, have invented a new and useful Improved Machine for Grinding Cutlery; and that the following is a full, clear, and exact description thereof, reference being had to the accompanying drawings, making a part of this specification, and to the letters of reference marked thereon.

The object of my invention is to facilitate the grinding of the blades of cutlery uniformly to any desired form upon their sides—that is to say, that the sides may be uniformly concave, flat, or convex, as may be desired.

To this end, my invention consists of a movable platform, having a movable table hinged to a slide moving upon said platform, with a rock-shaft eccentric arranged with the table, so that the latter may be given a vertical swinging movement when moved up to the grindstone, to grind the blades to any desired degree of convexity or form upon their sides. A set-lever is also combined with the movable table, to hold the latter in the desired position firmly while grinding the blades.

Figure I is a perspective view of my invention, showing the rear and upper parts of the machine; and Fig. II is a perspective and front view.

In the drawings, A represents a trough, in one end of which the grindstone B has its bearings, and upon the other end of which is arranged a platform, $a'$, so as to move freely between the guides C toward or from the revolving stone B. Upon this platform $a'$ are secured transversely the guides $a$, between which a slide, $c$, is arranged to move in a direction across the platform; and to this slide is pivoted or hinged a table, D, in such manner that the end of the table nearest the stone may be tilted up and back. This table has the holders $n$ arranged on the front, which may be arranged either with a screw and nut on the end, or with a cam, to be drawn in against the front end of the table, so that a blade placed inside the holder, next the front end of the table, may be held fast while being ground.

Disposed in suitable bearings $o$ is a rock-shaft, $e'$, upon which is an eccentric, $e$, which, as it is revolved by said rock-shaft, bears upon the platform $a'$, so that when a rocking motion is given to the shaft by a lever, L, attached thereto, the table D will be elevated or depressed at its front end, moving vertically upon its hinge on the slide $c$. The table is moved to and fro across the platform conveniently by means of a lever, $g$, pivoted at $f$, and is held firmly in its desired position by making said lever elastic, and allowing its rear end to drop into notches $i$ made in the rear end of the platform, or in a plate attached thereto.

The platform $a'$ and table D, secured thereto, are moved toward and from the stone B by means of a shaft, $h$, extending beneath the platform, and connected therewith either by a rack and pinion, or by a rod or link connection, or by any other convenient means; and this shaft $h$ may also terminate in a lever, F, by which a rocking movement is given to the shaft $h$, to move the platform to and fro between the guides C.

The operation of my invention is as follows: The platform $a'$ and table D being first moved away from the stone, the holders $n$ are loosened and a blade placed therein, between it (the holder) and the table, and each holder is then tightened. The lever $g$ is then placed in one of the notches $i$ in the rear end of the platform, and the latter, with the table D, moved up toward the stone B by means of the lever F. The side of one blade is then ground, giving it the desired degree of concave, flat, or convex form, by either holding the lever L in a rigid and firm position, or by moving the lever to and fro, more or less, which movement gives the shaft $e'$ and eccentric $e$ a slight rocking motion while the blade is against the stone, which gives the side of the blade the desired form. The platform $a'$ is then moved back, and the lever $g$ is changed into the other notch $i$, and the table moved up to the stone with the platform, bringing the other blade against the stone to be ground. Both platform and table are then moved back, and the blades are changed from each holder to the other, and their other sides ground as before. When it is desired to examine the work more particularly, or to change the blades in the holders, the lever L is placed back against the projection $s$, and by pressing back on the lever the table will be tilted up and back at its forward end, and by removing the pressure from the lever the table again drops into place.

It will thus be seen that the blades of cutlery may be ground true to any desired shape on the sides, and with perfect exactness, by the use of this machine, and very much faster and cheaper than by any process of grinding by hand.

Having thus described my invention, what I claim as new is—

1. In a machine for grinding cutlery-blades, the combination of the movable platform $a'$, the slide $c$, the table D hinged to said slide, and the rock-shaft and eccentric $e$, arranged with said table, all to give its forward end a vertical vibratory movement in front of the grinding-stone, substantially as described.

2. The combination of the movable platform $a'$, the slide $c$, moving in guides upon and at right angles to said platform, the table D, hinged to said slide, the rock-shaft and eccentric $e$, arranged to give the forward end of said table a vertical vibratory movement, the set-lever $g$, for holding the slide and table in their desired position, and the grinding-stone B, all operating substantially as and for the purposes herein set forth.

FAREWELL BOOKER.

Witnesses:
T. A. CURTIS,
G. H. BLANDEN.